UNITED STATES PATENT OFFICE.

EMERICH POLGÁR, OF SZEGEDIN, AUSTRIA-HUNGARY.

MANUFACTURE OF SPIRITS FROM AMYLACEOUS MATERIALS.

SPECIFICATION forming part of Letters Patent No. 497,814, dated May 23, 1893.

Application filed January 21, 1893. Serial No. 459,240. (No specimens.) Patented in Austria-Hungary October 13, 1892, No. 48,208 and No. 46,515.

*To all whom it may concern:*

Be it known that I, EMERICH POLGÁR, a subject of the King of Hungary, residing at Szegedin, in the Kingdom of Hungary, in the Empire of Austria-Hungary, have invented certain new and useful Improvements in the Treatment of Amylaceous Material for the Production of Alcohol and for Obtaining Valuable By-Products, (for which I have obtained Letters Patent in Austria-Hungary, dated October 13, 1892, and numbered, respectively, 48,208 and 46,515;) and I do hereby declare the following to be a full, clear, and exact description of the invention, such as will enable others skilled in the art to which it appertains to make and use the same.

My invention has relation to the manufacture of spirits from amylaceous materials and it has for its object the provision of means whereby the percentage of spirits obtained and the value of the by products are materially increased. The disintegration of the primary amylaceous materials employed in the manufacture of spirits and of yeast has heretofore been effected by cooking under a pressure varying from three to five atmospheres, and under a temperature varying from 138° to 144° centigrade. These high temperatures have for their result the decomposition or partial decomposition not only of the fatty constituents of the primary material, but also of all the other constituents thereof, as for instance, the albuminous and even the starchy constituents. This decomposition entails a loss in fatty constituents, a reduction in the percentage of spirits (which in the case of maize never exceeds 34.5 liters per one hundred kilos) and a material depreciation in the nutritive qualities of the spent grain. This injurious decomposition can readily be perceived by the mere appearance of the wort, which is of a dark brown color, while the spent grain has a bitter taste. On the other hand, not even traces of the fatty constituents of the primary material can be detected on the surface of the wort. My invention is designed to avoid this injurious decomposition by the addition to the primary amylaceous material of a solution of a salt of a metal of the alkalies or a solution of an alkaline earth, whereby I am enabled to effect the cooking under considerably less pressure and lower temperature, the latter not exceeding 127° centigrade, at which temperature neither the proteic nor the albuminous constituents of the amylaceous material are decomposed, and the starchy constituents are more effectually dissolved, which implies a corresponding increase in the yield of spirits.

My invention is based upon the following chemical reactions: If starch is combined with a solution of a salt of the metals of the alkalies or with a solution of an alkaline earth at a low or normal temperature and agitated, the starch is at once converted into a paste, which by addition of water becomes perfectly fluid and is then in the most favorable condition for saccharification by the diastase of the malt after the solution has been properly neutralized by addition thereto of an acid, while, on the contrary, in the processes heretofore resorted to, the reduction of the starch into paste commences at a temperature of about 60° centigrade. Under the action of the alkaline solution mixed with the primary material at a normal temperature, whether of soda or potash, or lime or magnesia, the starch is not only converted into a paste at a very low temperature as compared with that above referred to, but the alkaline solution attacks the intercellular tissues that envelop the starchy constituents of the primary material and disintegrate the same during the operation of cooking much more readily and effectually than is the case in usual processes. It follows that the cooking can be effected at much lower temperatures and pressures than has been the case heretofore, the reduction being such as to completely avert the decomposition of the fatty or oily and other constituents of the amylaceous material used. The action of the alkali on these fatty constituents results in emulsifying or saponifying the same, so that they will rise and float on the surface of the wort after fermentation and can then be readily skimmed off for use.

In carrying out my process I proceed as follows: The amylaceous material (as for instance a cereal) is first crushed or preferably reduced to meal or flour, for the purpose of facilitating, enhancing and expediting the action of the alkaline solution upon the starchy constituents and inter-cellular tissues of the grain. This is introduced into a cooker provided with suitable agitating or stirring devices, said cooker containing a solution of a salt of the metals of the alkalies or of an alkaline earth, the proportion of water being about one half the quantity required to cook the batch of meal or flour, while the proportion of such salt or salts or alkaline earth varies according to the proportion of starch in the meal. The whole is then intimately mixed at or above normal temperature, but the latter should not be higher than 60° centigrade. The proportion of water relatively to that of the meal or flour should not exceed three parts of the former to one part of the latter, this being one half of the quantity of water required for the cooking. The agitation of the contents of the cooker is preferably continued for about an hour, so as to bring the alkaline constituent into intimate contact with all the particles of meal or flour and thereby render its action more energetic, after which the other half of the water is added, the cooker is closed, and its contents cooked for two or three hours under a pressure which may vary from two to 2.5 atmospheres, corresponding with a temperature of 120° to 127° centigrade, the cooked material being then transferred to a macerator. Although I prefer to cook the material under pressure, this is not absolutely necessary, but the temperature should not vary much from 120° to 127° centigrade, for the reason that the conversion of the starch into a soluble substance takes place at a temperature of about 120° centigrade, and for the reason that the decomposition of the fatty constituents of the grain takes place at a temperature higher than 127° centigrade. It is therefore obvious that the quantity of recoverable fatty constituents or oils in the grain used is proportioned to the temperature under which the meal or flour is cooked, consequently, the lower the cooking temperature the greater the proportion of fatty constituents obtained under the action of the heat.

The proportion of the salt of a metal of the alkalies will, as above stated, vary with the proportion of starch in the grain employed, and may generally be stated to be from 0.3 to 1.5 kilos to one hundred kilos of starch, and if lime or magnesia is used the proportions will be from one to three kilos of either to one hundred kilos of starch.

In practice I prefer to employ caustic or carbonate of soda on account of its cheapness and also for reasons presently to be given.

The cooked mash has a strong alkaline reaction and shows on its surface the undecomposed fatty or oily constituents, inasmuch as only a portion of the fatty or oily constituents are saponified or emulsified by the alkaline reaction. Inasmuch as the saccharifying power of diastase reaches its maximum energy only in a neutral or slightly acid medium, I prefer to neutralize the alkaline mash by means of any suitable acid, as for instance, hydrochloric or sulphuric acid in slight excess before adding the aqueous solution of malt, when saccharification will ensue at once and will be completed in from one to two hours.

When operating on a large scale I prefer to employ hydrochloric acid as a neutralizing agent, not only on account of its low cost, but on account of its action upon the sodic salt converting the same into soluble sodium chloride (i. e., common salt) that remains in the spent material and forms a condiment therefor greatly relished by cattle, so that the feeding thereto of salt can be dispensed with.

Yeast is added to the saccharified mash for the purpose of fermenting the same as usual, after which the wort is distilled in the ordinary manner.

The mash is of a light yellow color and is of a sweet and agreeable taste, while the fermentation takes place under the most favorable conditions, the yield of spirits being from one to two liters per cent. more than that resulting from processes now practiced. As soon as secondary fermentation sets in the fatty constituents saponified or emulsified by the alkali commence to rise to and float on the surface of the wort, and can readily be skimmed off as soon as fermentation has ceased.

The described process (irrespective of the increase in yield of spirits) is of particular value when maize or Indian corn is employed as a raw material, owing to the great commercial value of the fatty constituents thereof and the high percentage (from five to six per cent.) of said constituents. In the use of other amylaceous materials, as for instance, potatoes or rye, the yield in fatty constituents is comparatively small, for the reason that the proportion of such constituents in the materials referred to is small and of inferior quality. The essential advantage of my process lies, however, in the more complete dissolution of the starchy constituents of the amylaceous material, in a freer and purer fermentation resulting in an increased yield of alcohol and in the improved quality of the spent grain, which contain undecomposed all of their fatty constituents, unless previously removed, as stated.

Having thus described my invention, what I claim as new therein, and desire to secure by Letters Patent, is—

1. In the manufacture of spirits, the improvement which consists in mixing one half of the water required to form a mash and a salt of a metal of the alkalies or an alkaline earth with the reduced amylaceous material, as grain, intimately combining the whole in an open vessel at a temperature not exceeding 60° centigrade, then adding the other half of the water and cooking the mash in a closed vessel at a temperature not exceeding 127° centigrade, for the purpose set forth.

2. In the manufacture of spirits, the improvement which consists in mixing one half of the water required to form a mash and a salt of a metal of the alkalies or an alkaline earth with the reduced amylaceous material, as grain, intimately combining the whole in an open vessel at a temperature not exceeding 60° centigrade, then adding the other half of the water and cooking the mash in a closed vessel at a temperature not exceeding 127° centigrade, neutralizing the mash by means of hydrochloric acid and removing the supernatent oleaginous constituents, and distilling in the usual manner after fermentation, substantially as set forth.

In testimony whereof I affix my signature in presence of two witnesses.

EMERICH POLGÁR.

Witnesses:
LOUIS GERSTER,
MAX SCHWEIGER.